United States Patent [19]

Stach

[11] 4,410,878

[45] Oct. 18, 1983

[54] DIGITAL SIGNAL TRANSMISSION

[75] Inventor: Ralf-Michael Stach, Auenwald, Fed. Rep. of Germany

[73] Assignee: Licentia Patent-Verwaltungs-G.m.b.H., Frankfurt, Fed. Rep. of Germany

[21] Appl. No.: 201,266

[22] Filed: Oct. 27, 1980

[30] Foreign Application Priority Data

Nov. 3, 1979 [DE] Fed. Rep. of Germany ....... 2944459

[51] Int. Cl.$^3$ ............................................. H03K 13/24
[52] U.S. Cl. ............................... 340/347 DD; 455/608
[58] Field of Search ................... 340/347 DD; 375/17; 455/608

[56] References Cited

U.S. PATENT DOCUMENTS

| | | | |
|---|---|---|---|
| 3,434,059 | 3/1969 | Kesolits | 375/17 |
| 4,006,304 | 2/1977 | Sell | 178/691 |
| 4,008,390 | 2/1977 | Runge | 455/608 |

FOREIGN PATENT DOCUMENTS

| | | |
|---|---|---|
| 13990 | 8/1980 | European Pat. Off. . |
| 18142 | 10/1980 | European Pat. Off. . |
| 2529448 | 1/1977 | Fed. Rep. of Germany . |
| 2656054 | 6/1977 | Fed. Rep. of Germany . |
| 2624101 | 11/1978 | Fed. Rep. of Germany . |
| 2748832 | 4/1979 | Fed. Rep. of Germany . |
| 2844293 | 4/1979 | Fed. Rep. of Germany . |
| 2845828 | 5/1979 | Fed. Rep. of Germany . |
| 2827958 | 9/1979 | Fed. Rep. of Germany . |
| 2911012 | 10/1979 | Fed. Rep. of Germany . |

OTHER PUBLICATIONS

Elektronorm Jg 17 (1963), Heft 11, pp. 556–557.
Bacher et al., Datenübertragung, Siemens Aktiengesellschaft, 1978, pp. 303–305.

*Primary Examiner*—C. D. Miller
*Attorney, Agent, or Firm*—Spencer & Kaye

[57] ABSTRACT

In a method and apparatus for transmitting digital signals by means of signal generators by initially converting a double current pulse train, under control of bit clock pulses and before transmission, into a first unipolar pulse train composed of pulses corresponding to all positive transmission pulses and into a second unipolar pulse train composed of pulses corresponding to all negative transmission pulses, the pulse trains are code converted independently of the duration of the bit clock pulses for producing a converted signal having a first transmitting amplitude in correspondence with each pulse of the first pulse train and a second transmitting amplitude in correspondence with each pulse of the second pulse train, the second amplitude differing from the first, and the converted signal is applied to a signal generator for producing an output signal corresponding to the converted signal and in which the transmitting amplitudes corresponding to both unipolar pulse trains vary the output signal in the same polarity direction.

7 Claims, 5 Drawing Figures

DIGITAL SIGNAL TRANSMISSION

BACKGROUND OF THE INVENTION

The present invention relates to a method for transmitting digital signals by means of signal generators in which a double pulse train is initially converted before transmission into a first single polarity, or unipolar, pulse train for all positive transmission pulses and into a second single polarity pulse train for all negative transmission pulses.

The simplest form of digital signal transmission is the noncoded binary signal transmission. One drawback of such a type of transmission is that it does not contain sufficient time information, i.e. it is impossible to synchronize the signal receiver when there are long periods when the signal value does not change. It is likewise impossible to monitor the signals for errors because there are no typical code characteristics which could be checked.

Frequently it is necessary to use a bipolar code for transmission, e.g. at interfaces in PCM networks, according to CCITT G. 703, the HDB3 code.

A bipolar code is less susceptible to interference since it does not contain a direct current component. However, when transmitting digital signals by means of optical fibers, the signal generator is known to be able to transmit only signals whose amplitudes are of identical phase, i.e. opposite signal amplitude polarities can not be distinguished. It would be conceivable to superpose the bipolar code on a direct current component which is so high that the negative and positive signal components would both have the same polarity with respect to the 0 level, i.e. would have identical amplitude phase values. But that would mean that the power density would increase considerably. Error correction and clock pulse recovery are preferably effected by means of an HDBn or CHDBn code, as those codes are defined by CCITT.

German Offenlegungsschrift [Laid-open Application] No. 2,844,293 discloses a method and system for modulation and demodulation for digital signal transmission in which the digital signal to be transmitted is coded according to a code which employs three signal images which differ from one another in time and lie within one signal period T, such as are obtained by modulating pulses of a carrier with respect to amplitude as well as position (pulse amplitude-pulse position modulation). This method requires a considerable amount of circuitry for coding and modulation. Moreover, it must then be determined in a decision circuit which one of the three signal images was transmitted. With a high data transmission rate and long transmission paths it may happen that delay errors occur which result in faulty scanned values during decoding German Pat. No. 2,624,101 discloses a decoding method for an HDBn decoder in which a received pulse train in the HDBn code is initially converted into one unipolar pulse train for all positive transmitted pulses and into a second unipolar pulse train for all negative transmitted pulses. The conversion into these two pulse trains here serves only to permit examination of the pulses to monitor adherence to the HDBn rule and to monitor the transmission path and the decoder by testing the bipolarity. No mention is made in German Pat. No. 2,624,101 of digital signal transmission by processing these unipolar pulse trains or of an energy saving transmission method.

German Offenlegungsschrift No. 2,845,828 discloses a method for transmitting binary sequences wherein each bit of a first value is represented by a signal element of a first level during the first half of a bit clock pulse period and subsequently by a signal element of a second level which is clearly different from the first level and which occurs during the second half of the same bit clock pulse period. Here again, a complicated coding and decoding apparatus is required. Additional errors may occur due to the dependence of the code conversion on the clock pulse.

SUMMARY OF THE INVENTION

It is an object of the present invention to make possible the transmission of digital signals with low transmission energy and simplified coding and decoding devices.

These and other objects are achieved, according to the invention, in a method for transmitting digital signals by means of signal generators by initially converting a double current pulse train, under control of bit clock pulses and before transmission, into a first unipolar pulse train composed of pulses corresponding to all positive transmission pulses and into a second unipolar pulse train composed of pulses corresponding to all negative transmission pulses, by code converting the pulse trains independently of the duration of the bit clock pulses for producing a converted signal having a first transmitting amplitude in correspondence with each pulse of the first pulse train and a second transmitting amplitude in correspondence with each pulse of the second pulse train, the second amplitude differing from the first, and applying the converted signal to a signal generator for producing an output signal corresponding to the converted signal and in which the transmitting amplitudes corresponding to both unipolar pulse trains vary the output signal in the same polarity direction.

The invention is particularly well suited for the transmission of digital signals via optical fibers, but could also be used for the transmission of signals in the form of acoustic or other types of energy.

DESCRIPTION OF THE PREFERRED EMBODIMENTS

Figure 1:
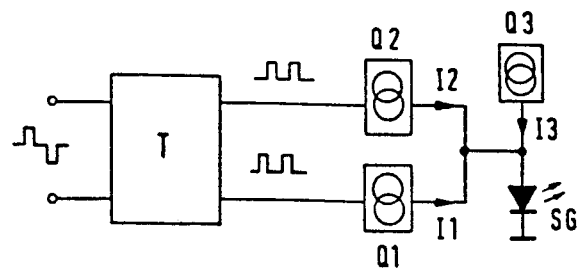
FIG. 1 is a simplified block circuit diagram for a circuit arrangement according to a preferred embodiment of the invention.

In FIG. 1, a double current pulse train which has been coded, for example, in the HDB3 code is initially converted by means of pulse trains. The pulse separating stage T can here be designed as a transformer whose secondary has a grounded center tap, as disclosed for example in German Offenlegungsschrift No. 2,845,828, or may be a logic linkage circuit. A first unipolar pulse train for all positive transmission pulses is then available at one output of stage T and a second unipolar pulse train for all negative transmission pulses is available at the other output of that stage.

The first unipolar pulse train controls a first current source Q1 which generates pulses of a current I1 in unison with this pulse train. The second unipolar pulse train controls a second current source Q2 which generates pulses of a current I2 in unison with the second unipolar pulse train.

It will be understood that the first and second unipolar pulse trains switch the current sources Q1 and Q2 according to the pulse widths of the first and second unipolar pulse trains. The two current sources Q1 and Q2 are adjusted with respect to one another in such a way that the current I2 has half the amplitude of the current I1. Both currents are then combined and together control a signal generator SG in a unipolar manner. In the embodiment of the invention illustrated here, this signal generator SG is composed of an optical transmitting device such as a laser diode or an LED.

For optimum operation of the optical transmitting device it is advisable to provide an underlying low direct current component I3 from a constant current source Q3. In this way it can be assured that the optical transmitting device operates in the linear range of its characteristic and with a minimum of noise.

Figure 2:
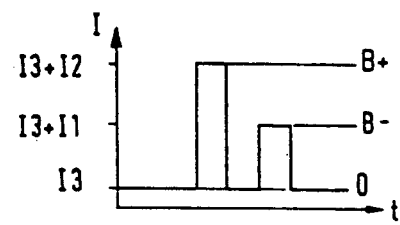
FIG. 2 is a signal diagram of the current of a code converted pulse train with respect to time in the operation of the circuit arrangement according to FIG. 1.

FIG. 2 shows the current vs. time waveform for the code converted pulse trains when a circuit arrangement according to FIG. 1 is used and the zero level has been shifted by current I3. It can be seen that the first transmitting amplitude B+ is, relative to I3, twice as high as the second transmitting amplitude B−.

Figure 3:
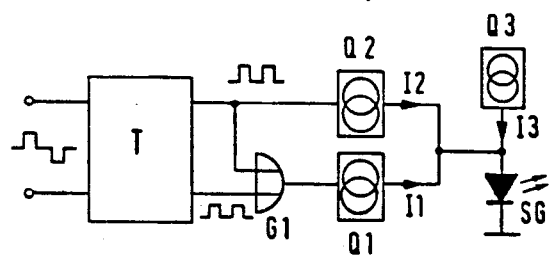
FIG. 3 is a view similar to that of FIG. 1 of another embodiment of a circuit arrangement according to the method of the invention.

FIG. 3 shows another circuit arrangement according to the invention. The double current pulse train is converted as before by means of the pulse separating stage T into the two unipolar pulse trains. The second unipolar pulse train controls the second current source Q2. The first current source Q1 is controlled by the output signal of an OR gate G1 at whose inputs there are present the signals of both unipolar pulse trains. The current sources Q1 and Q2 are adjusted in such a manner that their output currents I1 and I2 are identical. Both control the signal generator SG with identical polarity. If necessary a slight direct current component I3 can again be added.

Figure 4:
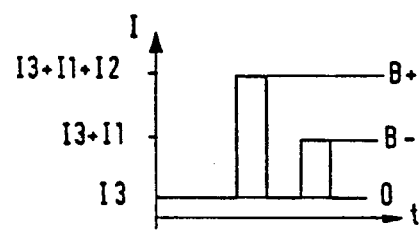
FIG. 4 is a diagram similar to that of FIG. 2 illustrating operation of the circuit arrangement of FIG. 3.

The current curve vs. time for the code converted pulse trains produced by this circuit arrangement is shown in FIG. 4. The positive transmitting amplitude B+ is here composed of the sum of the currents I3, I1 and I2, whereas in FIG. 2 B+ is the sum of the currents I3 and I1. The negative transmitting amplitude B− in FIG. 2 as well as in FIG. 4 is defined by the sum of the currents I3 and I2.

Figure 5:
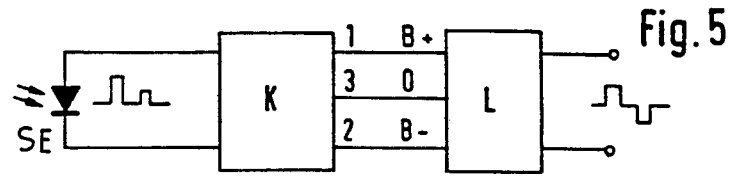
FIG. 5 is a block circuit diagram of a decoding device for signals produced by the circuits of FIGS. 1 and 3.

FIG. 5 shows an advantageous decoding device for recovering the double current pulse trains in their original form at the end of the optical transmission path. A signal receiver SE of a suitable known type is connected with a threshold value comparator K. The latter furnishes a signal at its output 1 as soon as ¾ of the value of the highest receiving level has been exceeded. This threshold value level of ¾ corresponds to the level B+. At the output 2 of the threshold value comparator K there appears a signal when ¼ of the value of the highest receiving level has been exceeded but ¾ has not yet been reached. This corresponds to the level B−. In all other cases, i.e. when the level of ¼ is not reached, a signal appears which corresponds to the zero level. The design of such comparator circuits has long been known in the art.

In a logic evaluation circuit L, which may be constructed in various ways from simple digital modules, the original bipolar signal is resynthesized.

The energy balance below shows the saving of transmission power. If it is assumed that logic 1 and 0, occur with equal frequency and that the signal pulses have a 50% duty ratio, use of the conventional codes HDB-3, AMI etc. results in the following association:

50% "0" - $P_m$ (average power)
25% "B+" - $P_s$ (peak power)
25% "B−" - $P_o$ (0 power)
From this it follows that $$P_m = \frac{P_s + P_o}{2}$$ and for the power to be transmitted $$P = \frac{P_m}{2} + \frac{P_s}{4} + \frac{P_o}{4}$$

$$= \frac{P_m}{2} + \frac{1}{2}\left(\frac{P_s + P_o}{2}\right)$$

$$= P_m,$$

i.e. a power level corresponding to $P_m$ must always be transmitted. Therefore the double current pulse train is superposed on a direct current signal associated with a power level of $P_m$.

If the association according to the invention is selected as follows:

50% "0" - $P_o$ (0 power)
25% "B+" - $P_s$ (peak power)
25% "B−" $P_m$ (average power)
the power to be transmitted will be as follows:

$$P' = \frac{P_o}{2} + \frac{P_s}{4} + \frac{P_m}{4},$$

$$= \frac{P_o}{2} + \frac{1}{2}\frac{P_s + P_o}{2} + \frac{P_m}{4},$$

$$= \frac{P_o}{4} + \frac{3}{4} P_m$$

The power savings $\Delta P$ is thus:
$\Delta P = P - P' = \frac{1}{4} P_m - \frac{1}{4} P_o$ By reducing the pulse width, which was assumed to be constant in the energy balance, the power consumption can be reduced even further.

To optimize the system for optical transmission it is advisable to select the transmitting amplitude which lies between the highest level and the zero level—in the illustrated embodiments of FIGS. 2 and 4 this is the transmitting amplitude B−—to be somewhat less than half the highest transmitting amplitude—here B+. The reason for this shift in the level of the transmitting amplitude B− lies in the annoying broadening of the power spectrum of the transmitted signals due to the noise of the optical receiving device, e.g. a photodiode, in dependence on the impinging light energy. With electrical signals there is no such broadening of the spectrum. The probability of error is reduced considerably by such system optimization.

At the receiving end, the threshold value stages of the threshold value comparator K must of course be adapted to this change in the levels of the transmitting amplitudes.

It will be understood that the above description of the present invention is susceptible to various modifications, changes and adaptations, and the same are intended to be comprehended within the meaning and range of equivalents of the appended claims.

What is claimed is:

1. In a method for transmitting digital signals by means of a light signal generator by initially converting a double current pulse train, under control of bit clock pulses and before transmission, into a first unipolar pulse train composed of pulses corresponding to all positive transmission pulses and into a second unipolar pulse train composed of pulses corresponding to all negative transmission pulses, the improvement comprising: employing first and second separately controllable current sources for code converting the first and second pulse trains independently of the duration of the bit clock pulses for producing a first converted current signal having a first amplitude in correspondence with each pulse of the first pulse train and a second converted current signal having a second amplitude in correspondence with each pulse of the second pulse train, the second amplitude differing from the first amplitude, employing a third separately controllable current source for producing a third current signal in correspondence with the absence of any pulse of either pulse train and having a third amplitude greater than zero and less than the first and second amplitudes, and applying the first, second and third signals to a light signal generator for producing a multilevel light output signal corresponding to the sum of the first, second and third signals and in which the first and second amplitudes corresponding, respectively, to the first and second unipolar pulse trains and the third amplitude vary the output signal in the same polarity direction.

2. Method as defined in claim 1 wherein the first amplitude is higher than the second.

3. Method as defined in claim 1 wherein the second amplitude is higher than the first.

4. Method as defined in claim 1 wherein one of the first and second amplitudes is twice as large as the other.

5. Method as defined in claim 1 where one of the first and second amplitudes is more than twice as large as the other.

6. In a circuit arrangement for transmitting digital signals and including means for initially converting a double current pulse train containing positive and negative pulses, under control of bit clock pulses and before transmission, into a first unipolar pulse train composed of pulses corresponding to all positive pulses of the double current pulse train and a second unipolar pulse train composed of pulses corresponding to all negative pulses of the double current pulse train, the improvement comprising: a first controllable current source connected to receive the first unipolar pulse train for producing a first converted signal composed of current pulses corresponding to each pulse of the first unipolar pulse train and having a first selected amplitude; a second controllable current source connected to receive the second unipolar pulse train for producing a second converted signal composed of current pulses corresponding to each pulse of the second unipolar pulse train and having a second selected amplitude substantially equal to one-half the first amplitude; a third current source producing a third signal corresponding to the absence of any pulse in either pulse train and having a third selected amplitude greater than zero and less than the second amplitude; and a light signal generator connected to receive the first, second and third signals for producing an output signal proportional to the sum of the first, second and third signals and the value of which is varied in the same direction by the current pulses of both of said converted signals and by the third signal.

7. In a circuit arrangement for transmitting digital signals and including means for initially converting a double current pulse train containing positive and negative pulses, under control of bit clock pulses and before transmission, into a first unipolar pulse train composed of pulses corresponding to all positive pulses of the double current pulse train and a second unipolar pulse train composed of pulses corresponding to all negative pulses of the double current pulse train, the improvement comprising: a first controllable current source connected to receive the first unipolar pulse train for producing a first converted signal composed of current pulses corresponding to each pulse of the first unipolar pulse train and having a first selected amplitude; OR-gate means having two inputs each connected to receive a respective one of the two unipolar pulse trains and an output providing a combined signal constituting a combination of the two unipolar pulse trains; a second controllable current source connected to receive the combined signal for producing a second converted signal composed of current pulses corresponding to each pulse of the combined signal unipolar pulse train and having a second selected amplitude substantially equal to the first amplitude; a third current source producing a third signal corresponding to the absence of any pulse in either pulse train and having a third selected amplitude greater than zero and less than the second amplitude; and a light signal generator connected to receive the first, second and third signals for producing an output light signal proportional to the sum of the first, second and third signals and the value of which is varied in the same direction by the current pulses of both of said converted signals and by the third signal.

* * * * *